UNITED STATES PATENT OFFICE.

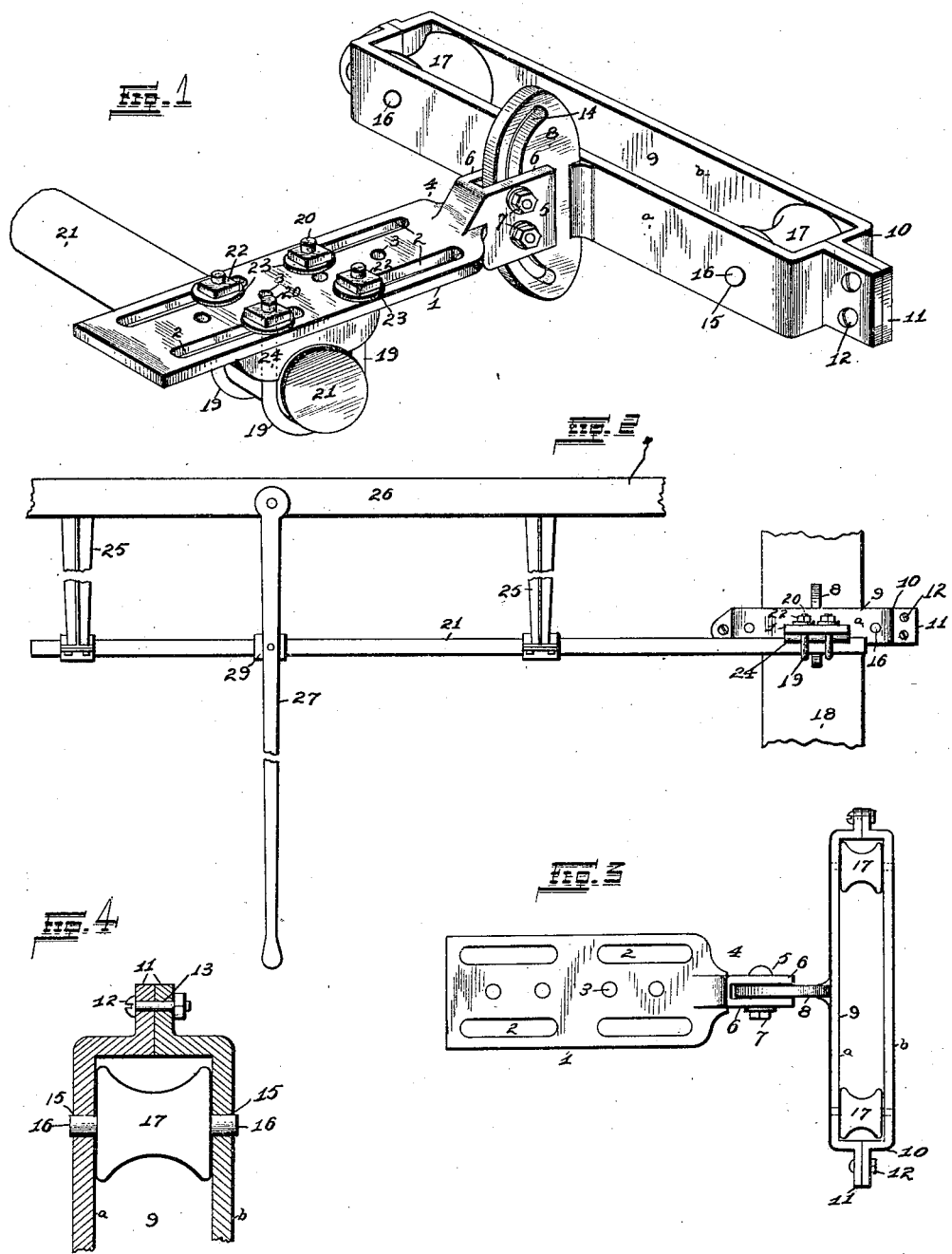

JOSEPH H. JOAQUIN, OF ST. LOUIS, MISSOURI.

BELT-SHIFTER.

SPECIFICATION forming part of Letters Patent No. 648,690, dated May 1, 1900.

Application filed January 15, 1900. Serial No. 1,446. (No model.)

*To all whom it may concern:*

Be it known that I, JOSEPH H. JOAQUIN, of the city of St. Louis, State of Missouri, have invented certain new and useful Improvements in Belt-Shifters, of which the following is a full, clear, and exact description, reference being had to the accompanying drawings, forming a part hereof.

My invention relates to belt-shifters; and it consists of the novel construction, combination, and arrangement of parts hereinafter shown, described, and claimed.

The object of this invention is to construct a belt-shifter which can be applied to any style of shifter-operating mechanism and can be adjusted to shift a belt at any angle.

Figure 1 is a perspective view of my complete invention, showing its construction and in operative position. Fig. 2 is a side elevation of the shifter-operating mechanism, showing its connection with my invention. Fig. 3 is a detail top plan view of my invention. Fig. 4 is a horizontal sectional view of a portion of the roller-frame, showing its construction and the manner in which the roller is held therein.

In the construction of the device as shown I provide a plate 1, which may be of any desirable size and is provided in its face with elongated slots 2, which are preferably four in number and arranged as shown in Fig. 1.

In the plate 1, intermediate of the slots 2, I provide apertures 3, which may be of any number and are for the purpose of receiving bolts in order to secure on the plate 1 a strip to support the shaft 21 at a greater distance from the roller-frame than can be done by the said plate.

The plate 1 is provided at its end 4 with an integral vertical projection 5, consisting of two ears 6, each of which is provided with apertures through which are inserted bolts 7. Between the ears 6 is placed and adjustably held a segment 8, which is secured in any desirable manner to or formed integral with the roller-frame 9, which consists of two parts *a* and *b*, each being bent at their ends 10 and provided with ears 11, by which said parts are held together by means of bolts or screws 12, passed through apertures 13, formed in said ears.

The segment 8 is provided with a circular slot 14, through which the bolts 7 pass, and is for the purpose to adjust the frame 9 in any angular position and retain the same in said position by the tightening of the bolts 7.

Each of the parts *a* and *b* of the frame 9 is provided with apertures 15, in which are held studs 16, formed on rollers 17, (see Fig. 4,) said rollers being for the purpose of coming in contact with the edges of the belt 18, so as to revolve while communicating with said belt, thus preventing any friction upon said belt while in the act of shifting and also preventing the edges of said belt from wearing, flattening, raveling, or in any way becoming mutilated, as is now the case where the present style of shifters is used.

My invention may be applied to any style of shifting-operating mechanism, either horizontal, vertical, or angular, and for a clear demonstration I show my invention applied to a shifting mechanism supported from the ceiling, which is of common construction. I attach my invention to this style of shifting mechanism by means of U-shaped rods 19, having their ends 20 provided with screw-threads. These rods are passed around a bar or shaft 21, their ends 20 being passed through the elongated slots 2 and held in position by nuts 22, passed over the threaded ends 20, coming in communication with the washers 23, also located over said ends and resting upon said plate 1. Upon the bar 21, beneath the plate 1, rests a block 24, its under surface being shaped to correspond with the shape of the bar and its top surface arranged flat to communicate with the under side of the plate 1. This block is to aid in tightly supporting my invention upon said rod when the U-shaped rods are tightly adjusted thereon. By the use of the U-shaped rods and elongated slots 2 the device can be adjusted to the proper length, so as to be in proper communication with the belt. The bar 21 is held in suitable hangers 25, secured to the rafters 26, and is shifted by means of a lever 27, fulcrumed to said rafter and pivotally mounted to said bar at 29 in any desirable manner. By the operation of the lever 27 the bar 21 is shifted, carrying with it my complete invention; also, the belt which passes through the frame 9, its edges communicating with the roller 17, conveying it from the loose to the tight pulley, or vice versa. The object of the frame 9 being in two parts is to allow said frame to be placed in position over said belt, and it can, if desired, be placed in position while said belt is in operation and by the use of the segment 8 can be adjusted to suit the angle or incline in which the belt is carried. With my improved construction the belt is in no way mutilated, as the rollers 17 are allowed to revolve, and their contact-surfaces being concaved it has a tendency to compress the edges of the belt inwardly instead of flattening or spreading the same. This I consider an essential feature of my invention, as by the use of the rollers the belt is saved, which is considered an item of much importance where machinery is used in manufacturing-shops. It also assists in the easy shifting of the belt, as the friction is dispensed with. I may also, in cases where it is necessary to apply my device where the belt is close to the wall, release the frame from the ears 6 and place therein the end 10 and tightly hold the same therein by means of the bolts 7, passed through the apertures formed in the ears 11, which will in this construction bring the frame 9 in direct alinement with the plate 1.

I claim—

1. A belt-shifter, having a plate, ears formed on one end of said plate, a segment provided with a slot, a frame secured to said segment, rollers carried on said frame, and a means for adjusting said frame and plate to correspond with the incline of the belt, substantially as specified.

2. A belt-shifter, composed of a plate provided with slots and apertures, an extension formed on said plate, said extension provided with ears, a segment provided with a slot held adjustably between said ears, a frame composed of two parts suitably secured together, one of said parts carried by said segment, rollers carried between said parts, and rods placed through said slots for holding said plate upon a bar, substantially as specified.

In testimony whereof I affix my signature in presence of two witnesses.

JOSEPH H. JOAQUIN.

Witnesses:
 EDWARD E. LONGAN,
 JOHN C. HIGDON.